C. W. KENNEDY.
FOUR WHEEL DRIVE MECHANISM.
APPLICATION FILED FEB. 24, 1917.
1,253,606.
Patented Jan. 15, 1918.
3 SHEETS—SHEET 1.
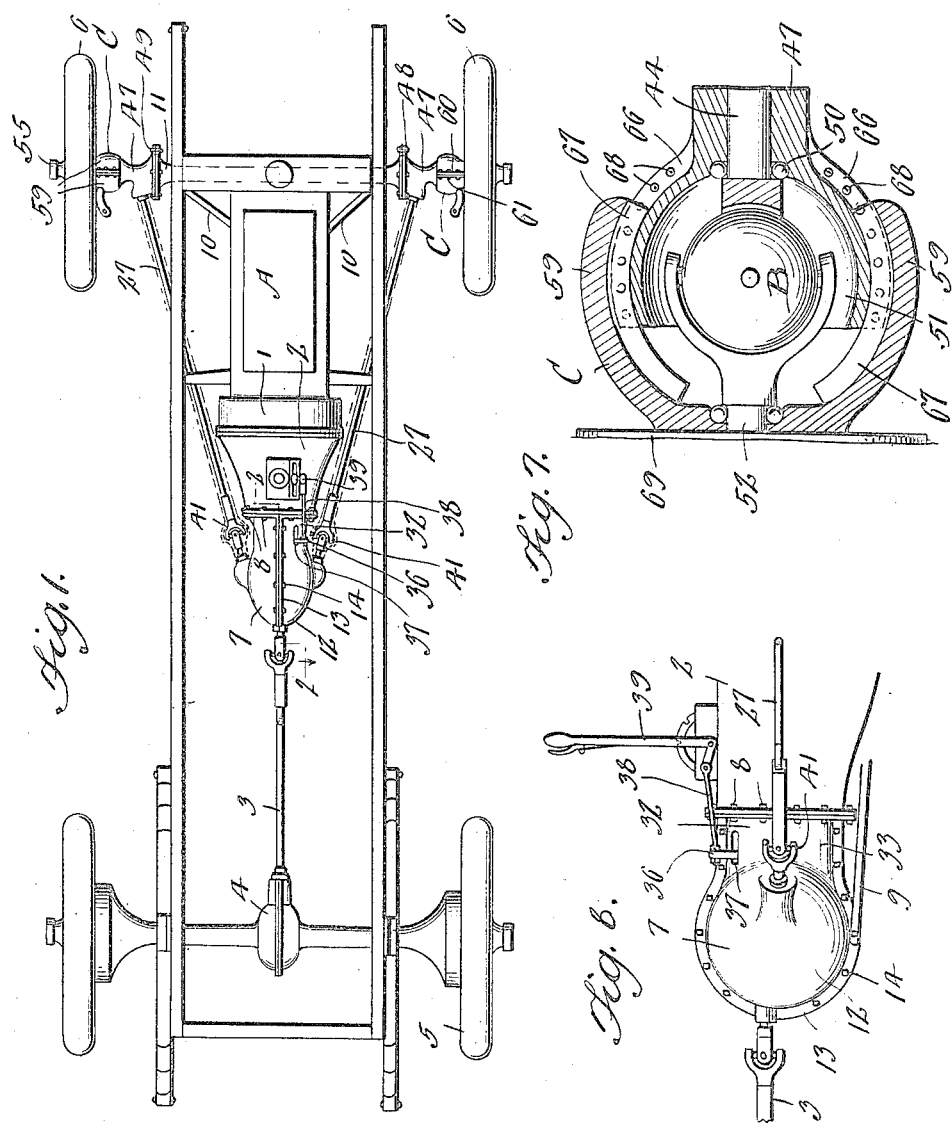
WITNESSES
INVENTOR
C. W. Kennedy,
BY Victor J. Evans
ATTORNEY C. W. KENNEDY.
FOUR WHEEL DRIVE MECHANISM.
APPLICATION FILED FEB. 24, 1917.
1,253,606.
Patented Jan. 15, 1918.
3 SHEETS—SHEET 2.
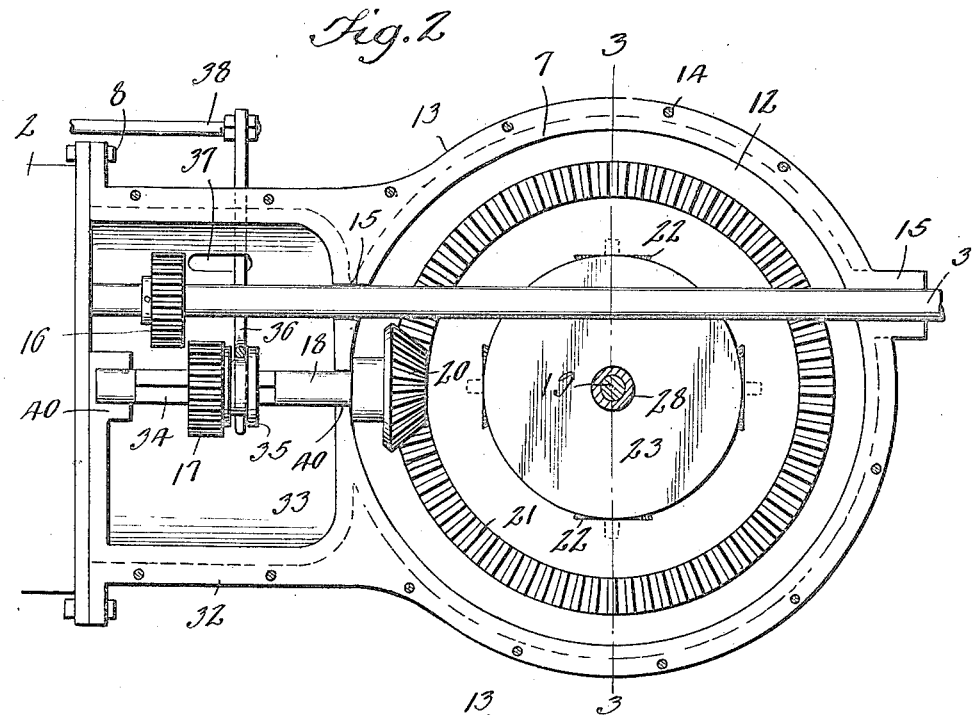
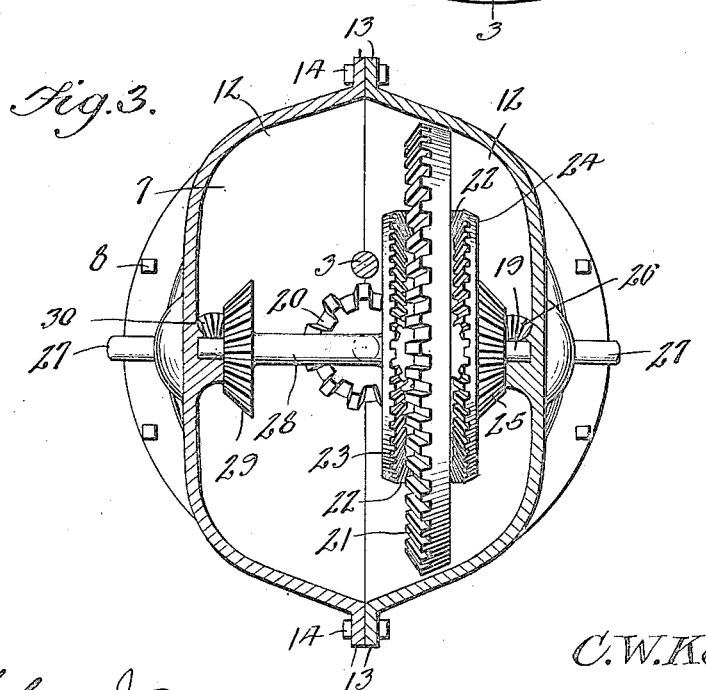
WITNESSES
INVENTOR
C. W. Kennedy,
BY Victor J. Evans
ATTORNEY

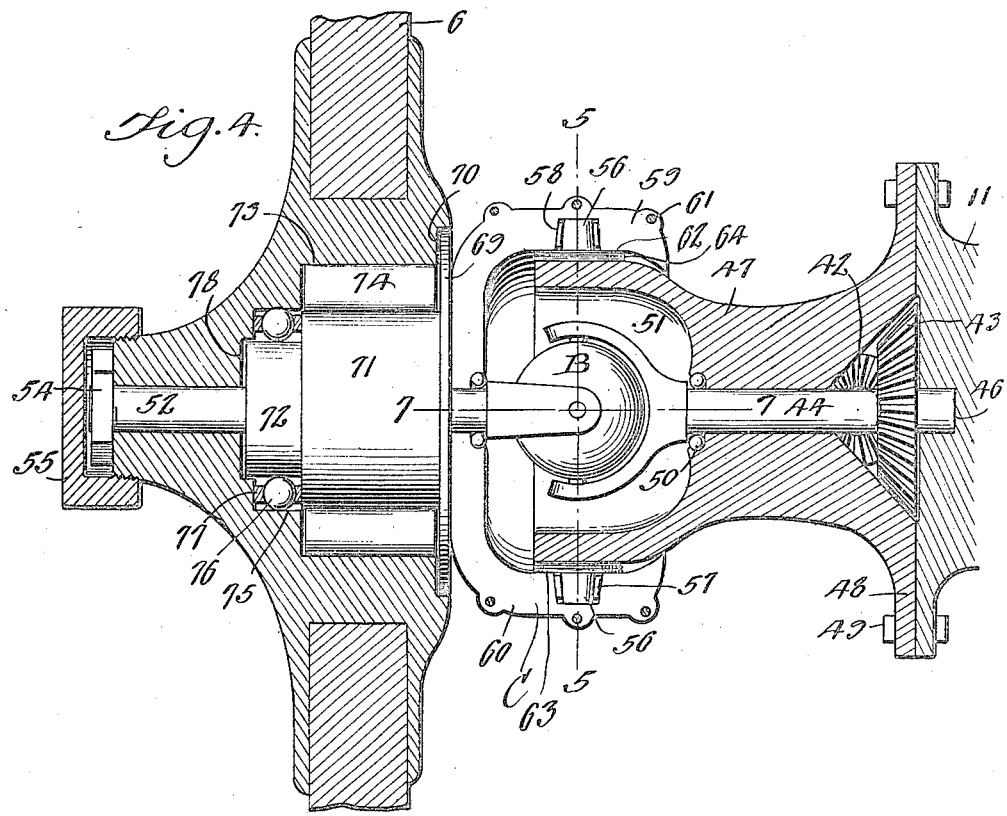
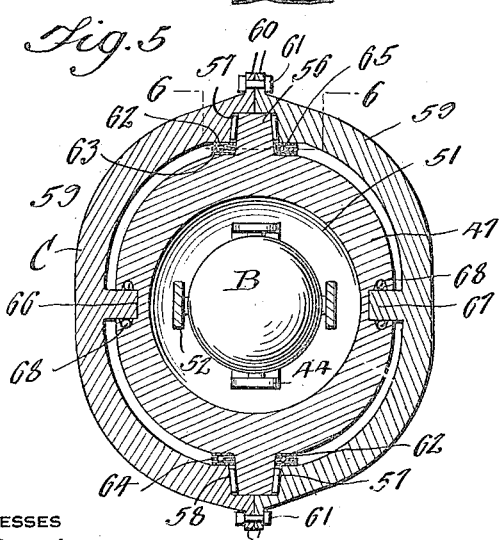
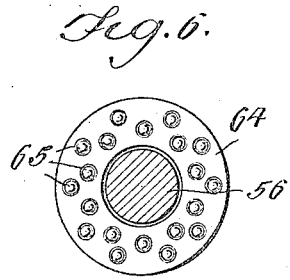

UNITED STATES PATENT OFFICE.

CHARLES WILLIAM KENNEDY, OF CLARENCE, MISSOURI, ASSIGNOR OF ONE-HALF TO WILBER JACKSON, OF MACON, MISSOURI.

FOUR-WHEEL DRIVE MECHANISM.

1,253,606.  Specification of Letters Patent.  Patented Jan. 15, 1918.

Application filed February 24, 1917. Serial No. 150,765.

*To all whom it may concern:*

Be it known that I, CHARLES WILLIAM KENNEDY, a citizen of the United States, residing at Clarence, in the county of Shelby and State of Missouri, have invented new and useful Improvements in Four-Wheel Drive Mechanism, of which the following is a specification.

This invention relates to four-wheel drive mechanism or as it is sometimes termed front wheel drive mechanism, the same being especially adapted to automobiles, motor trucks and all kinds of motor driven vehicles, enabling the power of the engine to be transmitted to the front wheels as well as to the rear wheels of the machine and also enabling the rear wheels to be driven independently of the front wheels, the arrangement being such that when the front wheel driving mechanism is in operation, the driving power of the engine is distributed to all four of the vehicle wheels, all of which then become traction wheels.

Another object in view is to provide two sets of differential gearings, one of which is used for driving the rear wheels of the machine and the other of which is used only when power is transmitted to the front wheels, therefore saving wear and tear on the second differential gearing when the front wheel driving mechanism is not needed, at such times for example when the machine is traveling on good or fairly level roads or when the vehicle has only a light load or no load at all.

With the above and other objects in view, the invention consists in the novel construction, combination and arrangement of parts, herein described, illustrated and claimed.

In the accompanying drawings:—

Figure 1 is a general plan view of the chassis of a motor vehicle illustrating the four-wheel driving mechanism as contemplated in this invention.

Fig. 2 is an enlarged vertical longitudinal view of the front wheel differential gearing, with the adjacent section of the housing removed, showing also the means for throwing said differential gearing into and out of operation.

Fig. 3 is a cross section on the line 3—3 of Fig. 2.

Fig. 4 is an enlarged vertical longitudinal section through a portion of the front axle and one of the front wheels, showing the driving connections, with certain parts in elevation.

Fig. 5 is a cross section on the line 5—5 of Fig. 4.

Fig. 6 is a fragmentary section on the line 6—6 of Fig. 5.

Fig. 7 is a fragmentary horizontal section on the line 7—7 of Fig. 4.

Fig. 8 is a fragmentary side elevation showing the housing of the front wheel differential gearing, and the parts intimately associated therewith.

In the drawings A designates an internal combustion engine which is conventionally shown, 1 the fly-wheel housing, 2 the housing of the transmission gearing, 3 the drive shaft or transmission shaft, or in other words the shaft which ordinarily extends from the transmission gearing to the rear axle where it is associated in the usual manner with the ordinary differential gearing contained in the housing 4. 5 designates the rear driving wheels of the machine and 6 the front wheels which, under the present invention, are used both as driving and steering wheels.

In carrying out the invention I employ a casing or housing 7 for what may be termed the front or second differential gearing, said casing being fastened by means of bolts 8 or the equivalent thereof directly to the rear end of the housing 2 containing the transmission gearing. If desired braces 9 may connect the housing 7 with the housing 2 or the fly-wheel housing 1, and other braces 10 may be interposed between the base of the engine and the front axle 11 of the vehicle.

The casing 7, as illustrated in Fig. 3 is made in two substantially equal sections 12 formed with marginal flanges 13 secured together by fastening means 14, the joint between the meeting faces of the flanges 13 being preferably tight so that the housing forms a container or receptacle for any suitable lubricating material. The housing 7 is formed with bearings 15 for the main transmission or driving shaft 3 as illustrated in Fig. 2, said shaft extending directly through the housing, above the center thereof and over the shaft about which the main elements of the differential gearing turn. Fast on the shaft 3 is a driving gear 16 which is adapted to mesh with another gear 17 slidable in relation to the gear 16. The slidable gear 17 is mounted on a countershaft 18 arranged in parallel and spaced relation to the shaft 3 and preferably directly in line with a shaft 19 about which the differential gears rotate. Fast on the shaft 18 is a driving pinion 20 which constantly meshes directly with a ring gear or master gear 21 which carries with it a plurality of pinions 22 that mesh simultaneously with gears 23 and 24 arranged at opposite sides of the pinions 22 and the ring gear 21 as shown in Fig. 3, the same as the ordinary differential gearing now in common use. The gear 24 at one side of the ring gear 21 is provided with a beveled gear face 25, which meshes with a gear 26 on the rear end of one of a pair of forwardly diverging front wheel transmission shafts 27 (see Fig. 1). The other gear 23 at the opposite side of the ring gear 21 is fast on a sleeve or tubular shaft 28 having also fast thereon a gear 29 which meshes with another gear 30 on the rear extremity of the other one of the front wheel transmission shafts 27. The sleeve or tubular shaft 28 is journaled upon the central shaft 19 having a bearing at its opposite ends in the sections 12 of the housing 7 as shown in Fig. 3. In said figure it will be noted that the main transmission or driving shaft 3 passes over the tubular shaft 28 and also over the driving pinion 20, ample clearance being provided between said members 3 and 20. In order to provide for the gears 16 and 17 and the countershaft 18 together with the shifting mechanism for the gear 17, the sections of the housing 7 are formed with extensions 32 to provide a compartment 33 for the purpose stated, as shown in Fig. 2. The countershaft 18 is shown as having a squared portion 34 while the gear 17 has a bore of corresponding shape, causing said gear 17 to rotate with and drive the shaft 18 while being permitted to slide longitudinally thereon. Any other well known expedient may be employed to cause the shaft 18 and gear 17 to rotate together while admitting of the necessary sliding movement of said gear. The gear 17 is formed with a hub 35 having an annular groove to receive a gear shifting member 36 which extends through a slot 37 in the housing and has connected thereto a shifting member 38 shown in the form of a rod or link connected to a shifting lever 39 within reach of the operator of the machine. The countershaft 18 is journaled in bearings 40 in the housing extension as shown in Fig. 2.

The shafts 27 are provided with universal joints 41 at a suitable point in the length thereof to provide for the up and down movement of the machine frame in relation to the front axle. The forward ends of the shafts 27 have fast thereon gears 42 which mesh with other gears 43 fast on short spindles driving shafts 44 extending longitudinally beyond the opposite ends of the front axle 11, the latter being provided with bearing sockets 46 to receive the inner ends of the shafts 44.

Each of the shafts 44 is also journaled in an axle extension 47 which is flanged as shown at 48 and secured to the adjacent end of the axle by fastening means 49. The axle extension 37 contains a ball bearing 50 for the shaft 44 and the outer portion of said extension is formed with a cavity 51 to receive a universal joint B, which connects the shaft 44 with the wheel spindle 52 on which the adjacent front wheel 6 is fastened by means of a nut 54 inclosed by a hub cap 55 threaded on the hub as shown in Fig. 4.

The axle extension 47 which forms a member of the steering knuckle is provided with upper and lower trunnions 56 tapered toward their extremities as shown and encircled by an annular series of antifriction rollers 57, said trunnions and rollers being mounted in bearing sockets 58 of corresponding shape in the upper and lower walls of a knuckle member and housing designated at C and composed of sections 59 which, as shown in Figs. 4 and 5 are provided with marginal flanges 60 secured tightly together by fastening means 61. The bearing sockets 58 are formed in the meeting faces of the sections 59 of the knuckle housing C so that when said sections are separated from each other, the extension 47 and the housing C may be separated from each other. Surrounding each of the trunnions 56 is an end thrust ball bearing comprising hardened steel bearing rings 62 and 63, interposed between which is a ball cage ring 64 formed with a number of pockets or holes as shown in Fig. 6 to receive anti-friction balls 65. This greatly reduces friction at two very important points corresponding with the pivotal centers between the extension 47 and the knuckle housing C, said thrust bearings serving to take the weight of the load and the thrusts imparted by the wheels to the axle in negotiating rough roads.

As shown in Figs. 5 and 7, the extension 47 is formed in the opposite sides thereof with arcuate guideways 66 which receive arcuate bearing ribs 67 on the interior of the sections 59 of the knuckle housing C. In the upper and lower walls of the guideways 66 there are formed pockets to receive anti-friction balls 68 which bear against the top and bottom faces of the arcuate bearing ribs 67. The bearings just referred to provide for the horizontal swinging movement of the steering knuckle during the steering operation and assist the thrust bearings surrounding the trunnions 56 in sustaining the load and road shocks. Each knuckle housing C is formed with an annular flange 69 while the adjacent wheel 6 is formed in the inner face of the hub thereof with an annular rabbet 70 which receives said flange 69, the arrangement just described, serving to exclude water, dirt and other foreign matter from the bearings for the wheel 53. On the outer side of the flange 69 is a cylindrical bearing surface 71 formed integrally with the flange 69 and extending from the outer side of the bearing member 71 is a smaller cylindrical bearing surface 72. The wheel hub is formed with a circular recess 73 of sufficient size to receive rollers 74 which surround the cylindrical bearing surface 71. The wheel hub is also formed with a smaller counterbore 75 of sufficient size to receive an annular series of balls 76 which surround the cylindrical bearing surface 72 and are contained in a revoluble ball retaining cage 77, positioned between the adjacent end of the cylindrical bearing 71 and an abutment wall 78 within the wheel hub.

From the foregoing description taken in connection with the accompanying drawings it will now be seen that the power of the engine may either be transmitted to all four of the wheels of the vehicle and equally distributed thereto or the front wheels may be thrown out of gear and all of the power transmitted to the rear wheels. The construction and arrangement described will greatly aid in hill climbing and to a great extent overcome the difficulties encountered in driving a vehicle over muddy and soft roads, as the front wheels will prepare the roadway for the rear wheels by packing the road surface, thereby enabling the rear wheels to obtain a better hold and greater traction. Furthermore there is not the same tendency for the front wheels to skid, as power is being constantly delivered thereto when the front driving mechanism is in operation and therefore the front wheels become in effect and act as traction wheels, as well as the rear wheels. The vehicle will start with greater ease on account of the traction of all the wheels and the wear and tear on the rear tires and wheels will be reduced, as the front wheels will bear their proportion of the work. This not only saves the tires but increases the life and durability of the vehicle as a whole as the strains and stresses are distributed throughout the driving connections described and shown.

I claim:—

1. In a motor vehicle, the combination of a motor located near the front of the machine and supported by the frame thereof, a rear driving axle, transmission gearing located in rear of the motor, a transmission shaft extending from said transmission gearing to the rear axle for driving the latter, differential gearing forming a connecting means between said transmission shaft and rear axle, a second differential gearing located in rear of the transmission gearing, and front wheel transmission shafts actuated by said second differential gearing and geared to the front wheels, said second differential gearing embodying a countershaft carrying the driving pinion of the last named differential gearing, said countershaft being in parallel and spaced relation to the main transmission shaft and in line with the axis of movement of the differential gears, and means for throwing said countershaft into and out of driven engagement with said main transmission shaft.

2. In a motor vehicle, the combination of a motor located near the front of the machine and supported by the frame thereof, a rear driving axle, transmission gearing located in rear of the motor, a transmission shaft extending from said transmission gearing to the rear axle for driving the latter, differential gearing forming a connecting means between said transmission shaft and rear axle, a second differential gearing located in rear of the transmission gearing, and front wheel transmission shafts actuated by said second differential gearing and geared to the front wheels, said second differential gearing embodying a countershaft carrying the driving pinion of the last named differential gearing, said countershaft being in parallel and spaced relation to the main transmission shaft and in line with the axis of movement of the differential gears, means for throwing said countershaft into and out of driven engagement with said main transmission shaft, the last named means comprising gears on said main transmission shaft and said countershaft, and means for shifting one of said gears into and out of mesh with the other gear.

3. In a motor vehicle, the combination of a motor located near the front of the machine and supported by the frame thereof, a rear driving axle, transmission gearing located in rear of the motor, a transmission shaft extending from said transmission gearing to the rear axle for driving the latter, differential gearing forming a connecting means between said transmission shaft and rear axle, a second differential gearing located in rear of the transmission gearing, and front wheel transmission shafts actuated by said second differential gearing and geared to the front wheels, said second differential gearing embodying a countershaft carrying the driving pinion of the last named differential gearing, said countershaft being in parallel and spaced relation to the main transmission shaft and in line with the axis of movement of the differential gears, means for throwing said countershaft into and out of driven engagement with said main transmission shaft, and a shaft on which the differential gears are mounted extending at right angles to the main transmission shaft and in spaced relation thereto.

4. In a motor vehicle, the combination of a motor located near the front of the machine and supported by the frame thereof, a rear driving axle, transmission gearing located in rear of the motor, a transmission shaft extending from said transmission gearing to the rear axle for driving the latter, differential gearing forming a connecting means between said transmission shaft and rear axle, a second differential gearing located in rear of the transmission gearing, and front wheel transmission shafts actuated by said second differential gearing and geared to the front wheels, said second differential gearing embodying a countershaft carrying the driving pinion of the last named differential gearing, said countershaft being in parallel and spaced relation to the main transmission shaft and in line with the axis of movement of the differential gears, means for throwing said countershaft into and out of driven engagement with said main transmission shaft, the last named means comprising gears on said main transmission shaft and said countershaft, and means for shifting one of said gears into and out of mesh with the other gear, said shiftable gear being slidable longitudinally of the shaft on which it is mounted and being engaged to rotate therewith.

In testimony whereof I affix my signature.

CHARLES WILLIAM KENNEDY.

Copies of this patent may be obtained for five cents each, by addressing the "Commissioner of Patents, Washington, D. C."